United States Patent [19]

Beals et al.

[11] 3,800,903

[45] Apr. 2, 1974

[54] COAXIAL STEERING WHEELS FOR AN ARTICULATED MOTOR GRADER

[75] Inventors: Duane E. Beals, Decatur; Gary S. Peifer, Waynesville, both of Ill.

[73] Assignee: Caterpillar Tractor Co., Peoria, Ill.

[22] Filed: Jan. 17, 1972

[21] Appl. No.: 218,408

[52] U.S. Cl............... 180/79.2 B, 74/493, 74/494, 180/79.2 C, 280/91
[51] Int. Cl.......................... B62d 5/06, B62d 13/02
[58] Field of Search ... 180/23, 24, 51, 77 S, 79.2 B, 180/79.2 C, 78; 280/87 R, 91; 74/493, 494

[56] References Cited
UNITED STATES PATENTS

| | | | |
|---|---|---|---|
| 2,748,509 | 6/1956 | Brown et al. .................... | 180/24 X |
| 1,716,732 | 6/1929 | Mossay ......................... | 280/87 R X |
| 3,520,209 | 7/1970 | Cescone........................... | 74/493 |
| 3,515,235 | 6/1970 | Kamner........................... | 180/79.2 B |
| 2,494,324 | 1/1950 | Wright............................. | 180/51 X |
| 3,527,315 | 9/1970 | Hampton ........................ | 180/51 |
| 2,796,140 | 6/1957 | Knolle ........................... | 180/77 S X |
| 3,389,762 | 6/1968 | Mandekic........................ | 180/79.2 B |
| 3,327,413 | 6/1967 | Brinkmeyer et al......... | 180/79.2 B X |
| 3,424,473 | 1/1969 | Morgan............................ | 74/493 X |

FOREIGN PATENTS OR APPLICATIONS

| | | | |
|---|---|---|---|
| 494,729 | 10/1938 | Great Britain..................... | 280/91 |

Primary Examiner—Kenneth H. Betts
Assistant Examiner—Leslie J. Paperner
Attorney, Agent, or Firm—Fryer, Tjensvold, Phillips & Lempio

[57] ABSTRACT

An auxiliary, fingertip-controlled steering wheel for a motor grader is provided which is mounted forwardly and concentrically adjacent to a standard steering wheel so that conventional and/or articulated steering can be selectively and most effectively achieved.

1 Claim, 5 Drawing Figures

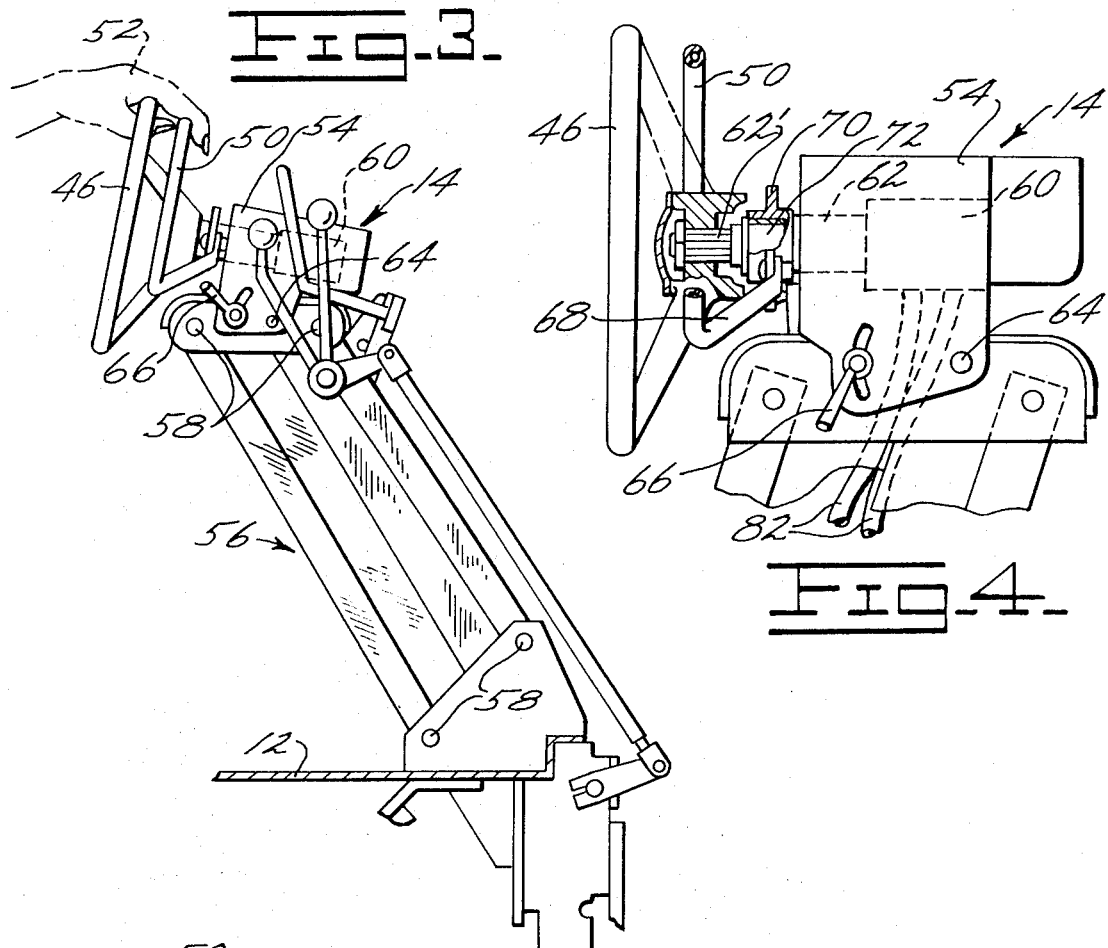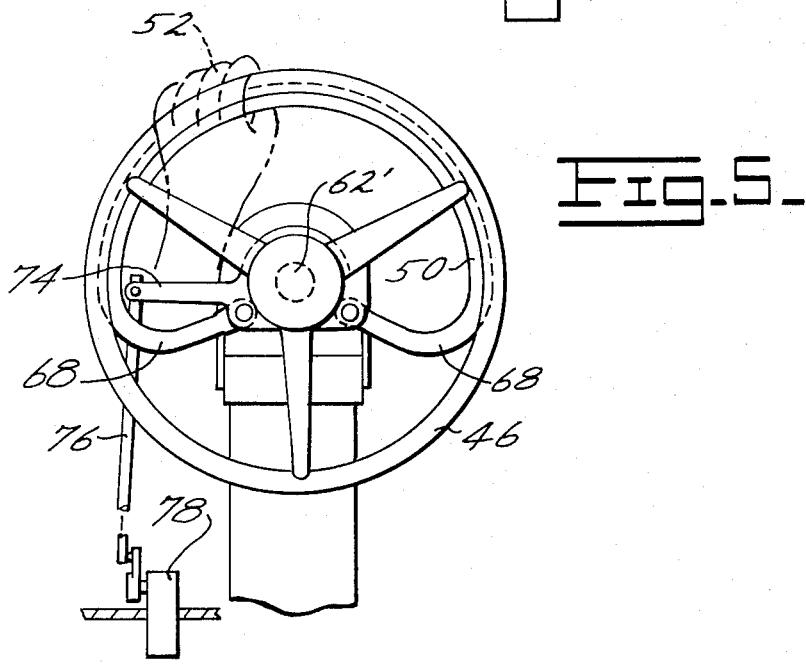

COAXIAL STEERING WHEELS FOR AN ARTICULATED MOTOR GRADER

CROSS-REFERENCE TO RELATED APPLICATION

Cross-reference is made to the invention entitled "Adjustable Control Console for Vehicles" disclosed in the common Assignee's Application Ser. No. 139,362, filed May 30, 1971.

BACKGROUND OF THE INVENTION

This invention relates to a steering system wherein two separate steering mechanisms are to be controlled. More particularly, this invention relates to vehicles having dual modes of steering such as articulated motor graders.

Conventional motor graders include many adjustable components; and with the required accuracy of grade to which they work in their normal application are considered by many to be the most difficult to operate of all earthworking machines. In addition to the usual steering, shifting of gears and controlling of engine speed, the operator must tend controls for varying the cutting angle, depth, tilt, and side shifting of the blade, as well as the lateral tilt of the front wheels of the grader.

A motor grader normally has a console containing a number of transmissions or fluid servos interposed between the power takeoff of the grader engine and linkage to the several components to be controlled. Mechanical or fluid transmissions drive selectively in opposite directions under control of levers which are supported on the console and connected to the shifting mechanisms, either directly or through hydraulic servos or the like. A conventional arrangement of controls on the console often requires use of the right or left hand to adjust a specific control. This is often awkward because the required hand may be occupied with another control.

Furthermore, the advent of hydraulically-operated motor graders with articulated (frame) steering, as well as Ackerman (front wheel steering), has aggravated the mode of control for this vehicle because still another operating function has been added to this already complex control arrangement. The current solution is to use levers which necessitate an operator rapidly releasing and securing alternate levers in an effort to maintain effective control during machine operations. This has not proved to be a satisfactory solution due to the fact that such levers are not always readily accessible to the operator as manual turning of the conventional steering wheel is accomplished.

SUMMARY AND OBJECTS OF THIS INVENTION

It is therefore an object of the present invention to provide an auxiliary, fingertip-controlled steering wheel for a motor grader which can be effectively and selectively controlled by the operator with a minimum of additional effort. This is accomplished merely be extending his fingertips and grasping the extra steering wheel to selectively obtain combined articulated steering, as well as conventional front wheel steering, in either direction.

It is a further object of the present invention to provide an auxiliary steering wheel for the complementing frame steering function that can be readily and economically adapted to the existing operator's control console with minimum complication of the operating control systems.

Still another object of the present invention is to provide an auxiliary steering wheel for the articulated steering system complementing a frame steering system that can be conveniently and single-handedly operated in conjunction with the conventional steering wheel without having either control operation detrimentally interrupted by a discontinuity of either steering system.

BRIEF DESCRIPTION OF THE DRAWINGS

FIG. 3 is a side elevational view illustrating the manner in which one operator's hand may be employed for simultaneous operation of both steering wheels on an adjustable control console;

FIG. 4 is an enlarged side elevational view with portions cut away to illustrate how the two control members would function jointly to effect, at the discretion of the operator, control of both the front wheel conventional steering system and articulated steering jacks; and FIG. 5 is an elevational view of the preferred embodiment of a conventional steering wheel and the subject auxiliary steering wheel.

Figure 1:
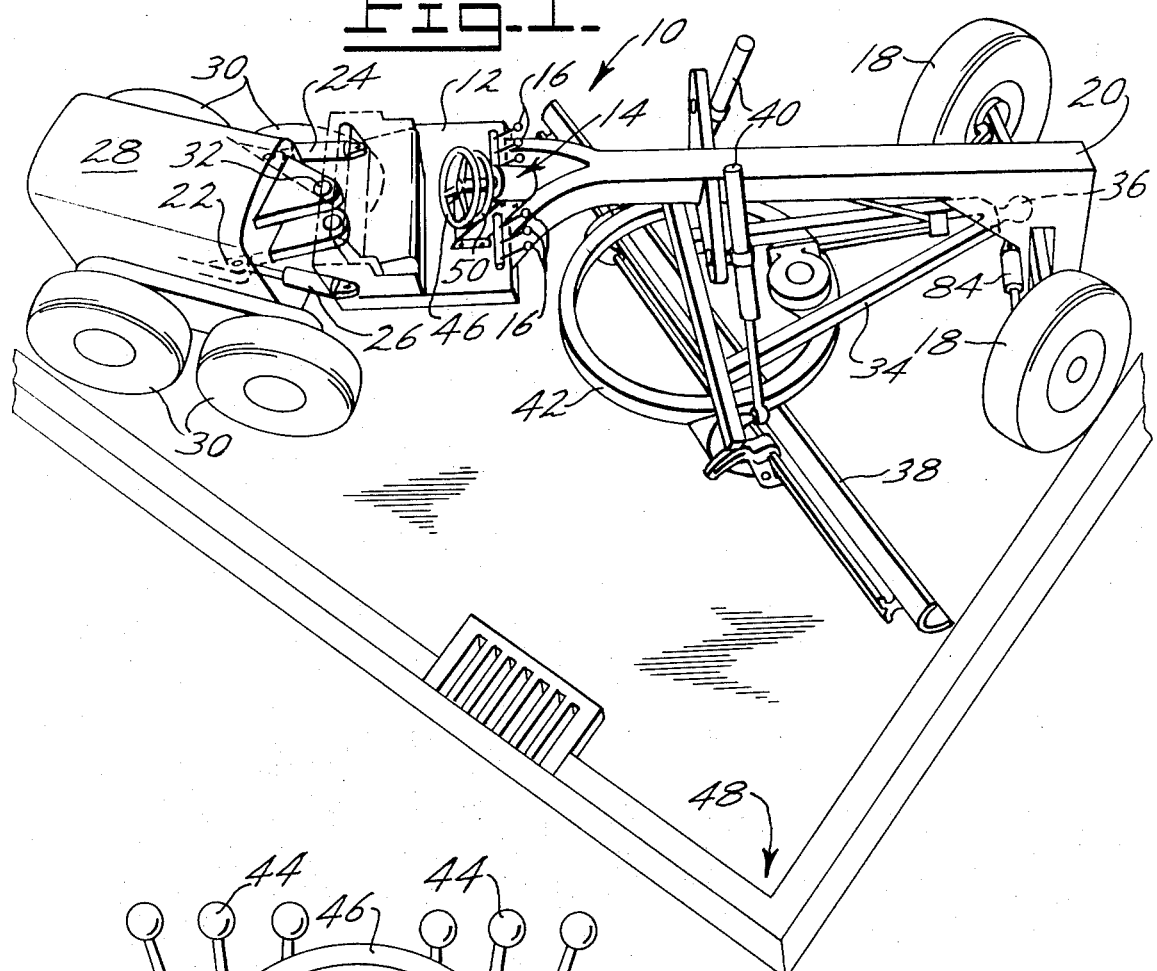
FIG. 1 is a top perspective view of an articulated motor grader with both the front steering system and articulated (frame) steering system actuated.

As shown generally at 10 in FIG. 1, an articulated motor grader has an operator's station 12 that includes a control console 14 comprising a plurality of operator control levers 16 by which the operator selectively manipulates numerous and varied earthworking implements, i.e., a scarifier, a blade circle reverse mechanism, blade side shift and front wheel tilt mechanisms, and blade lift and center shift controls. To obtain maximum accuracy and operating effectiveness, it is imperative that the vehicle's steering control be so adapted that maximum response and convenience are assured so that the earthworking implements will be accurately placed and maintained to obtain desired grades and slopes.

In the articulated motor grader steering arrangement, the dirigible wheel steering system comprising a pair of front steerable wheels 18 provides directional control of the entire vehicle chassis including both front chassis 20 and rear chassis 22. This steering system is complemented by an articulating steerable joint steering system consisting of a pair of hydraulic jacks 24 and 26 disposed immediately rearwardly of the operator's station 12. These jacks effect selective angling of a rear chassis or frame 22 including thereon a power unit 28, and a plurality of tandem drive wheels 30 relative to the operator's station and the forwardly extending main frame or front chassis 20 through a vertically extending main articulating pivot 32. As is the case with most motor graders, a drawbar 34 is pivotally coupled at a forward point 36 to front frame 20 so that a moldboard 38 is universally adjustable by means of jacks 40 by way of drawbar 34 and blade circle 42.

Figure 2:
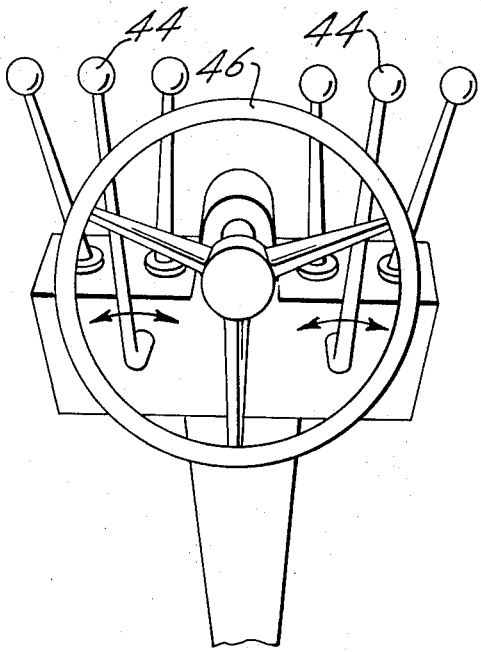
FIG. 2 is a pictorial elevational view of a prior art articulated motor grader steering column and control console wherein a pair of extra control levers are employed for manipulation of the articulated steering jacks.

As shown in FIG. 2, present correlated conventional and articulated steering controls comprise separate levers 44 to control the articulating steering jacks and a conventional steering wheel 46 to control the front steerable wheels. It will be readily noted that the operator would find the task of gripping the main steering wheel 46 and simultaneously activating the control levers 44 to be a difficult operation. This is because as wheel 46 is turned, the operator would no longer have ready access to the articulating control levers. For example, when the operator grasps one of the articulating steering jack control levers 44 and moves it either clockwise or counterclockwise for right or left turns, release of the normally spring-centered levers would make them inaccessible to the operator without the use of his alternate hand. Consequently, this could detrimentally affect operations in restricted area.

As shown in FIG. 1, motor graders are often required to manipulate in tight quarters such as when grading corners of parking lots generally shown at 48. In this application, both conventional front wheel and articulating (frame) steering are required to assure maximum machine access and moldboard reach. Operating motorized equipment in such close quarters requires substantial operator skill; therefore, a simple, effective control system which the operator can effectively control is imperative.

In this application, as the vehicle approaches the corner where rapid articulated steering will be required, ground speed is normally reduced. However, with the auxiliary steering wheel of the instant invention replacing the conventional control levers (FIG. 3), the operator can quickly grasp both the primary and auxiliary steering wheels 46 and 50, respectively, and effect an extreme left turn for both systems as shown. One hand, such as shown at 52, can retain the desired position while the other hand shifts the blade laterally to the right (FIG. 1) for maximum reach. In such extreme operating circumstances, single-handed operation of the dual mode steering systems is possible, thus freeing the operator's other hand to regulate the lateral positioning of the moldboard so that a close proximity of the blade end to the existing curb lines or grade stakes may be maintained.

As the vehicle leaves the restrictive corner area, a slow return to straight-line steering for the vehicle can be readily achieved by the operator turning both steering wheels to the right, which brings the rear tandem drive wheels into a close parallel relationship with the curb or grade line. Since motor graders are increasingly employed for landscaping operations, precise steering and operational control are of utmost importance to prevent damage to foundation walls or expensive shrubbery and trees.

FIG. 3 indicates how the adjacent relationship of the coaxially-disposed steering wheels 46 and 50 would conveniently allow the operator single-handedly to control both steering mechanisms. For maximum operating convenience, the console shown generally at 14 supporting the steering wheels is made adjustable by means of upright parallelogram linkage 56 which pivots longitudinally about pivots 58 for optimum fore and aft positioning of the steering wheels. A hood-like bracket 54 (FIG. 4), housing a valve 60 and a control shaft 62 providing common support for both steering wheels, also is made vertically adjustable through a pivot 64 and clamp handle 66 to alter the angular attitude of the wheels as presented to the operator.

FIG. 4 shown in partial section discloses how the auxiliary steering wheel 50 can be readily adapted to the standard steering mechanism by having its lower portion interrupted and deformed to provide a pair of radial support arms 68. Through these arms and a complementing sleeve bracket 70 and internal bearing 72, auxiliary wheel 50 is freely rotatable to selectively control the articulating steering system.

As seen in FIG. 5., such control is accomplished by a radially extending arm 74 and linkage 76 activating a spring-centered valve 78 which normally returns auxiliary wheel 50 to its upright position, concentrically aligned with the upper portion of the standard steering wheel.

The auxiliary steering wheel 50 is made to conform concentrically with the conventional steering wheel 46 entirely or in part, as shown, so that sufficient movement can be attained to obtain maximum response from the articulating steering jacks. As shown, the auxiliary steering wheel may take the form of an arcuate member disposed adjacent to and extending in parallel concentric relationship with approximately 180° of said primary steering wheel.

As indicated by the operator's hand 52 in FIG. 3, selective control of the auxiliary steering system is readily and conveniently obtained by tightening or relaxing fingertip hold of the auxiliary wheel 50 as the primary steering wheel 46 is rotated. The degree of response obtained from the auxiliary articulated steering system depends upon where the operator grasps steering wheel 46. As his hands rotate to the right or left over the circumferential length of the auxiliary wheel, any portion can be readily gripped before permissible limits of travel are exceeded. In response to wheel 46, support shaft 62 (See FIG. 4) rotates to influence complementing hydraulic control valve 60. Manipulation thereof provides a fluid signal through suitable hydromechanical means or communicating conduits 82 to the steering booster 84 (FIG. 1) disposed forwardly and in line with the front axle, which in turn effects the desired amount of steering through the forward dirigible type wheels 18. The auxiliary steering wheel 50, through limited pivotal movement on shaft 62', acts through a radially extending arm 74 (see FIG. 5), complementing linkage 76, and spring-centered valve 78 to sequentially direct pressure fluid to jacks 24 or 26 for their coordinated extension and retraction required for the articulated steering effort.

During operation, manipulation of the steering controls individually or simultaneously will direct fluid pressure to the forward steering booster 84 and the articulated steering jacks 24 and 26 at a relatively coordinated rate so that both steering systems will be equally responsive. In some circumstances, it would be desirable to operate with the front dirigible wheels 18 and the tandem drive wheels 30 of the rear chassis 22 operating in a laterally offset condition. In such operations, the drive wheels can be kept off finish grades and/or kept on dry, stable soil while the forward wheels and moldboard extend sideward to clear drainage ditches, side hills, etc. This steering condition can be effected simply by operating the steering systems independently in an opposite direction until an offset condition is attained.

Normally, the coordinated control functions of the steering systems will allow uniform rotational moment of steering wheels 46 and 50 to complement each other in that pressure fluid would be communicated to the cylinder end of jack 24 and rod end of jack 26 for simultaneous extension and retraction of these members to obtain a desired leftward angular change between the rear chassis 22 and front chassis 20 from their normal longitudinally aligned condition. Conversely, to obtain a right turn in the shortest possible radius, both wheels 46 and 50 would be simultaneously rotated to the right, which would rotate the forward wheels to their extreme right position and direct pressure fluid alternately to the cylinder end of jack 24 and rod end of jack 26 so that the frame and power unit would attain an angular relationship just opposite of that depicted in FIG. 1.

It is to be understood that the foregoing description is illustrative of a preferred embodiment of the invention and that the scope of the invention is not to be limited thereto, but is to be determined by the scope of the appended claims.

What we claim is:

1. In a vehicle with dual modes of steering, a conventional dirigible wheel system at its forward extremity and an articulating steerable joint system with a pivot means having a substantially vertical axis disposed between a front and rear frame of the vehicle having a fluid actuated pair of jacks mounted on opposite sides of the verical axis of the pivot means interconnecting said front and rear frames for articulating said front frame with respect to said rear frame, a plurality of wheels on said rear frame, and an operator's station with manually manipulatable means for independently controlling each of said vehicle steering systems comprising, a console, a rotatable shaft extending outwardly from said console and controlling said wheel systems, a primary steering wheel supported by and fixed to said shaft to regulate the dirigible wheel system, a support sleeve bracket mounted on said shaft, an auxiliary wheel having a lower portion interrupted by a pair of arms extending radially inwardly and pivotally secured to said bracket and an upper arcuate portion connected to said arms disposed forwardly thereof, proximate to and extending in a parallel, concentric and coaxial relationship with approximately 180° of said primary wheel to regulate the steerable joint system whereby the operator can grip and turn both wheels simultaneously with a single hand to control both the dirigible wheel system and the articulating steerable joint system to provide simultaneous dual mode steering, said console further including means for selectively longitudinally adjusting the same with respect to the operator's station while maintaining the steering wheels in their original angular attitudes and additional means for pivotally adjusting the wheels in a vertical arcuate plane to alter the angular attitudes thereof, and complementing means operatively attached to each of said wheels to effect independent control of each steering system including hydromechanical actuating linkage connecting said wheels with their respective steering systems.

* * * * *